May 28, 1929.  T. S. KEMBLE  1,714,509
OILING SYSTEM FOR THE GEAR DRIVES OF GAS ELECTRIC AUTO BUSSES OR TRUCKS
Filed June 13, 1927
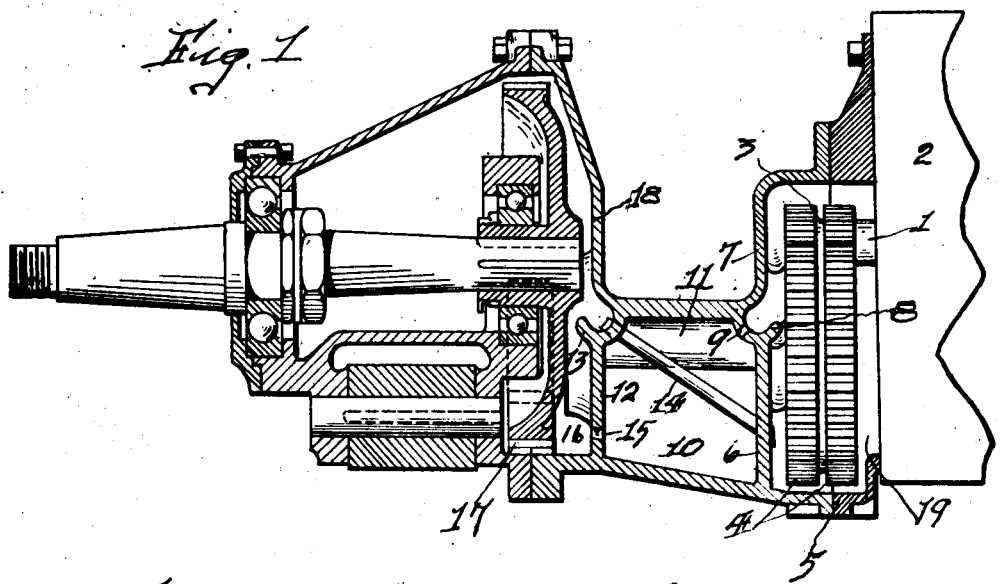
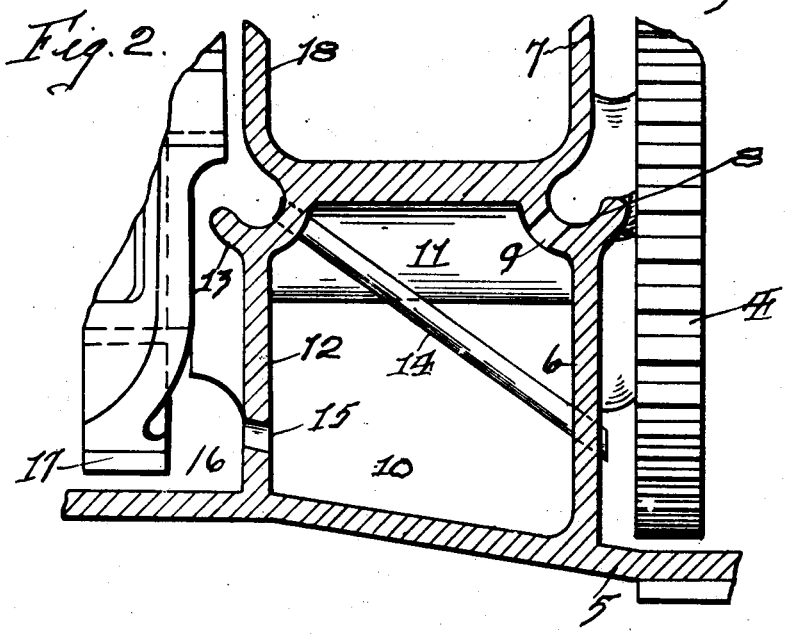
INVENTOR
Thomas S. Kemble
BY
Dodson
ATTORNEYS.

Patented May 28, 1929.

1,714,509

UNITED STATES PATENT OFFICE.

THOMAS S. KEMBLE, OF LAKEWOOD, OHIO, ASSIGNOR TO UNIVERSAL GAS ELECTRIC COMPANY, A CORPORATION OF DELAWARE.

OILING SYSTEM FOR THE GEAR DRIVES OF GAS-ELECTRIC AUTO BUSSES OR TRUCKS.

Original application filed June 30, 1924, Serial No. 723,772. Divided and this application filed June 13, 1927. Serial No. 198,663.

My invention relates to the type of gearing used to transfer the power of the electric motors to the wheels of an auto such as is described in my copending application, Serial No. 723,772, of which this is a division.

In gear housings for such trains of gears, where there is a plain oil well or bath which extends across the bottom of the housing, there is a great loss in power due to oil turbulence, and an excessive amount of lubricant on the high speed gears in order to supply sufficient and adequate lubrication to the slow speed gears.

My invention has for its object, to entirely overcome these objectionable features and yet provide a construction which will permit all of the gears to have ample lubrication practically in a bath of oil.

My means of accomplishing the foregoing object may be more readily understood by having reference to the accompanying drawings, which are hereunto annexed and are a part of this specification, in which—

Fig. 1 is a vertical sectional view of my improved oil well, only a fragmentary portion of the motor being shown, as obviously it forms no part of my invention; and Fig. 2 is an enlarged detail view, in section, showing how I divert the oil and direct it into the desired places. Similar reference numerals refer to similar parts throughout the entire description.

As shown in the drawings, the shaft 1 of the electric motor 2 has pinions 3 mounted thereon. These are high speed pinions, and are in mesh with gears 4. The pinions 3 and gears 4 are contained in a gear housing 5, the wall 6 of which constitutes a dam crosswise of the bottom of the gear case or housing 5. At the top of the wall 6 I form a trough 8, which is so constructed that it will catch the oil flowing down the wall 7. In this trough 8 I form openings 9 through which the oil thus caught will discharge into an oil compartment or well 10. The gears 4 drive the countershaft 11.

On the other wall 12 of the housing 5 I provide an oil catching trough 13. This trough 13 is connected by a tube 14 to the well at the bottom of the casing where the gears 4 are located. The trough 13 is arranged, as to its location and size, so that it will supply just enough oil to properly lubricate the gears 4 and the pinions 3, without providing any excess lubrication. This construction insures a complete and constant circulation of the oil. It is, however, necessary to provide openings 9 sufficient to care for the flow of oil in a volume enough greater than the capacity of the tube 14, so that a proper oil level will be maintained in the oil well 10.

It will be apparent from the foregoing description, that the gears 4 will throw the oil up on to the pinions 3, and the oil will then drop down the side wall 7 into the trough 8, passing thence through the holes 9 into the oil well 10. Holes 15 are provided in the wall 12 to permit the oil to flow from the oil well 10 into the compartment 16, which contains the driving pinion and gear 17. As this gear 17 rotates, it will obviously throw the oil up, and it will flow down along the inside of the wall 18 and into the trough 13, thence passing through the tube 14 to the compartment 19.

It will be apparent from the foregoing that I am able in this way to maintain a continuous flow of the lubricant over all of the gears and pinions, yet at no time is the accumulation of oil in a gear compartment sufficient to permit of churning, with the deleterious effect hereinbefore set forth.

Having described my invention, what I regard as new, and desire to secure by Letters Patent of the United States, is:

1. In an electric vehicular drive, the combination, with a gear casing surrounding the gears, of a train of gears, there being a compartment therein in which the motor pinion and gears are mounted and a second compartment in which the drive pinion and gear are mounted, an oil well intermediate the two compartments, means for automatically maintaining a suitable oil level in the motor pinion and gear compartment, while permitting a higher level in the oil well in which the drive pinion and gear are mounted, said means comprising troughs and oil passages, substantially as described.

2. In an electric vehicular drive, the combination, with a gear casing surrounding the gears, of a train of gears, there being a compartment therein in which the motor pinion and gears are mounted and a second compartment in which the drive pinion and gear are mounted, an oil well intermediate the two compartments, a trough formed on the wall of the first named compartment, there being openings in said trough leading to said oil well, a trough formed on the wall of the second compartment adjacent the driving gear, a tube, having a passage therethrough, leading from said last named trough to the first named compartment, there being openings in the bottom of said wall leading from the oil well to the driving gear compartment.

THOMAS S. KEMBLE.